United States Patent [19]

Takahashi et al.

[11] 3,899,370

[45] Aug. 12, 1975

[54] METHOD FOR PRODUCING COATED AND AGE HARDENED ALUMINUM OR ALUMINUM-BASED ALLOY MOLDED MATERIALS

[75] Inventors: Toshiro Takahashi; Toshihiro Nagano; Yasuo Aoshima, all of Shizuoka; Matsuo Suzuki, Yaizu; Shozo Suzuki, Shizuoka; Teruo Asahina, Fujieda, all of Japan

[73] Assignees: Riken Light Metal Industries Co., Ltd., Shizuoka; Kuboko Paint Co., Ltd., Osaka, both of Japan

[22] Filed: Jan. 17, 1973

[21] Appl. No.: 324,448

[30] Foreign Application Priority Data

Jan. 20, 1972 Japan.................................. 47-7230
Jan. 20, 1972 Japan.................................. 47-7231
Feb. 17, 1972 Japan.................................. 47-16675
Feb. 17, 1972 Japan.................................. 47-16676
Feb. 19, 1972 Japan.................................. 47-16908

[52] U.S. Cl.............. 148/159; 117/129; 117/132 B; 204/38 A

[51] Int. Cl.$^2$...................... C21D 1/00; B32B 15/08

[58] Field of Search..... 148/159, 3; 204/38 A, 38 E; 117/132 A, 132 B, 6.24, 129

[56] References Cited
UNITED STATES PATENTS

| | | | |
|---|---|---|---|
| 2,658,845 | 11/1953 | Barker................. | 148/159 |
| 3,404,998 | 10/1968 | Pesetsky............. | 148/159 |
| 3,759,758 | 9/1973 | Hatano............... | 148/159 |

*Primary Examiner*—Walter R. Satterfield
*Attorney, Agent, or Firm*—Waters, Schwartz & Nissen

[57] ABSTRACT

Molded materials of aluminum or aluminum-based alloy provided with painted film having a particularly high cohesion are produced in a continuous treatment from extrusion molding to finishing by subjecting an extrusion molded aluminum or aluminum-based alloy keeping a supersaturated condition, which is not subjected to a heat treatment for an age hardening, to usual pretreatments to be effected prior to painting, applying the thus treated molded material with a paint and then heating said molded material provided with a painted film at a temperature of 205±5°C for 50–120 minutes to effect an age hardening treatment of the molded material and to bake the painted film.

2 Claims, No Drawings

METHOD FOR PRODUCING COATED AND AGE HARDENED ALUMINUM OR ALUMINUM-BASED ALLOY MOLDED MATERIALS

The present invention relates to a method for producing aluminum or aluminum-based alloy molded materials and particularly a method for producing said molded materials by extruding an aluminum or aluminum-based alloy, subjecting to a surface treatment without effecting an artificial age hardening and then effecting the artificial age hardening.

In the specification, the aluminum or aluminum-based alloy is referred to as merely "an aluminous material".

Recently, the demand for aluminous materials has been increased and they have been broadly used for buildings, ships, aircraft and other fields because aluminous materials are lighter in weight than steel materials and are low in deformation resistance against outside forces and therefore readily extrusion molded into desired shapes.

In the conventional manufacture of extrusion molded materials from aluminous materials, a billet formed in the casting step is preheated at a temperature of 450°–500°C for 4 hours prior to the extrusion molding and the preheated billet is extruded at a temperature of 400°–500°C at a rate of 15–45 m/min. The extrusion molded material is cooled and, if necessary, is subjected to a contour correction treatment and then to an artificial age hardening to obtain aluminous molded materials having desired hardness and mechanical properties. The thus treated molded materials are generally subjected to a pretreatment and to a treatment for forming a base layer for painting, for example, anodic oxidation, conversion treatment and the like, after which a painting treatment is effected, in order to provide a beautiful coating and surface protection. molded materials extruded at a high speed are cooled and, if necessary, a contour correction treatment is effected and then the cooled molded materials are again heated at about 205°C to effect an artificial age hardening for about 1 hour.

The presence of the artificial age hardening treatment makes it difficult to effect the steps from the extrusion molding to the surface treatment in a continuous flow system.

Accordingly, the molding step of aluminous materials has been heretofore considered by dividing the extrusion molding step and the surface treating step of the molded materials and the discontinuity of steps has been a problem in the production of aluminous molded materials.

The division of the molding step and the surface treatment as mentioned above results in that the already hardened molded material is subjected to, for example, a surface roughening step as a pretreatment and therefore the pretreatment not only needs a long time but also the pretreatment is not always carried out completely and therefore the desirable painting cannot be obtained.

The present invention aims at the solution of the above described drawbacks and the first object is to provide a method for producing aluminous molded materials in which the treating steps from the extrusion molding to the surface treatment can be carried out in a continuous flow system.

Firstly, according to the present invention a billet of an aluminous material is preheated, extrusion molded and cooled and then if necessary is subjected to a contour correction treatment as mentioned above. In this case, the temperature and the other treatment conditions are same as in the conventional process.

Successively, the contour corrected molded material is degreased and washed with water and then the surface of the molded material is roughened and therhafter thereafter molded material is subjected to a treatment for forming a film, such as an anodic oxidation treatment, a treatment for forming a boehmite layer, a conversion treatment and the like.

A characteristic of the present invention consists in that the extrusion molded material has not yet been subjected to an age hardening treatment and is directly subjected to a pretreatment, for example, degreasing and washing with water.

The above described anodic oxidation treatment is typified by a process wherein an aluminous material is electrically treated by using the aluminous material as an anode in an electrolyte, such as sulfuric acid to form a porous oxidized film; the treatment for forming a boehmite layer is typified by a process wherein an aluminous material is immersed in boiling water to form boehmite layer which is a crystalline hydrate of aluminum oxide and the conversion treatment is typified by a process wherein an aluminous material is immersed in a mixed solution of sodium carbonic anhydride and sodium chromic anhydride to form a chemical film.

The films formed by such treatments can be satisfactorily used as a surface protection for the aluminous material without effecting an additional surface treatment depending upon the use, but when it is intended to increase the surface protection and beauty, these films are used as layers and then a spray painting, an immerse painting, an electrostatic painting may be effected thereon to form a coated film.

Each surface treatment is effected as mentioned above and then an artificial age hardening treatment is effected.

The temperature for this age hardening treatment is about 205±5°C and the time therefore is generally about 50 minutes but when the time is extended to about 120 minutes, the texture of the age hardened molded material is more stabilized and can develop favorably the properties as aluminous materials.

According to the present invention, the molded material extruded at a temperature of, for example, 400°–500°C is cooled as such and maintains the supersaturated state and since the surface treatments are effected successively in such a state, a preliminary aging proceeds during the surface treatment and this preliminary aging is combined with the following artificial age hardening treatment and therefore the aging of the molded material proceeds favorably and the aging time can be reduced.

Furthermore, according to the present invention, the surface treatment is carried out before the aging is completely finished and the artificial age hardening is carried out finally and consequently the respective steps from the extrusion molding to the surface treatment are completely combined as one line and there is no accumulation of the molded materials in the factory until transferring to the surface treatment after the extrusion molding that is caused in the conventional process and consequently the oil stain caused by the accumulation in the factory and the surface oxidation can be considerably decreased and the degreasing step and the etching step as the pretreatment for the surface treatment can be simplified.

Moreover, in the present invention the surface treatment and particularly the pretreatment are effected with respect to the molded material in an unstable super-saturated state, so that an etching can be carried out favorably.

According to the present invention, as mentioned above, since an aluminous material is not subjected to age hardening immediately after the extrusion molding but subjected to age hardening in the final step of the surface treatment steps, when a painting step is included, the present invention is further effective.

The second object of the present invention is to provide a method wherein an extrusion molded aluminous material is directly subjected to the pretreatment, such as degreasing, washing with water and the like and successively is subjected to a painting treatment and then the painted molded material is age hardened and simultaneously the painted film is cured.

Namely, the extrusion molded material is directly subjected to the surface treatment and the artificial age hardening after the surface treatment is effected together with the backing treatment of the painted film. In this case, the artificial age hardening aims at improvement of the properties of the molded material at a temperature of 205±5°C as mentioned above, while in the baking treatment of the painted film the treating temperature is determined depending upon the paint used.

Accordingly, if a thermosetting paint which completes the curing at the temperature of age hardening, is selected, the age hardening treatment and the baking treatment can be effected under the same condition.

If the age hardening treatment and the baking treatment can be accomplished under the same condition as mentioned above, it is not necessary to effect each step separately and idependently and the age hardening proceeds even during the baking treatment and on the other hand, the baking treatment proceeds during the age hardening treatment and the cohesion of the painted film due to the baking is considerably improved.

Furthermore, the other surface treatments according to the present invention may be the same as the conventional process and naturally for the formation of the base layer the anodic oxidation treatment, the treatment for forming a boehmite layer and the like may be carried out under the usual conditions.

The effect of the present invention can be more effectively developed by painting by means of a water soluble thermosetting resin paint.

Namely, the extrusion molded aluminous material, after the contour correction, is directly degreased and washed with water and subjected to etching and then the thus treated aluminous material is coated with a water soluble thermosetting resin paint containing an organic amine.

Since this treatment only applies the paint on the aluminous material, it is merely necessary to immerse the aluminous material in the above described paint solution.

The organic amines to be contained in the paint include dimethylethanolamine, monoethanolamine, triethylamine, diethylethanolamine, morpholine, butylamine and the like.

As the water soluble thermosetting resin paints, mention may be made of acrylic, alkyd, melamine, phenolic, urea and aminoalkyd series resin paints.

As mentioned above, after the water soluble paint solution is applied on the surface of the aluminous material, the superfluous paint solution is removed and said paint is set and while the surface of the aluminous material maintains a wet state, the aluminous material is heat treated at a temperature of 205±5°C for 50–120 minutes.

By this heat treatment, the age hardening of the aluminous material and the baking curing of the painted film proceed at the same time and further water and the organic amine contained in the paint depositing on the surface of the aluminous material act effectively to form a base film consisting of a boehmite layer which is a crystalline hydrate of aluminum oxide.

It contributes to decrease the steps and to improve the cohesion of the painted film that the formation of a boehmite layer as a base layer for painting and the baking curing of the painted film are effected simultaneously.

The base layer for painting which is composed of a boehmite layer, serves to improve the cohesion of the painted film obtained by painting the water soluble thermosetting resin paint and the boehmite layer is different from the other base layers and even if the aluminous material is deformed, the boehmite layer itself is not separated from the surface of the aluminous material nor broken.

The boehmite layer is formed by immersing the aluminous material in pure water at a temperature higher than 75°C but if an aqueous solution containing the organic amine is used, the formation is further promoted.

Accordingly, it is preferred that the boehmite layer be previously formed as the base layer prior to the above described painting and then the method of the present invention is applied.

However, if a water soluble thermosetting resin paint containing an organic amine is applied, when an aluminous material is immersed in said paint previously heated at a temperature of higher than 75°C, the boehmite base layer is formed on the aluminous material and simultaneously as the paint is applied and the effect of the present invention can be further promoted.

The above mentioned process for forming the painted film is a means for attaining the present invention and is not the main object.

The third object of the present invention is to provide a method for producing an aluminous molded material provided with a painted film having a high cohesion.

The present invention provides a method for producing an aluminous molded material provided with a painted film having a high cohesion by combining an artificial age hardening treatment which affects the hardness of the aluminous material and a mechanical roughening treatment of the aluminous material surface effectively, In this process, a billet of an aluminous material is preheated and extrusion molded and then the molded material is cooled and, if necessary is subjected to a contour correction treatment as mentioned above. Then the resulting aluminous molded material is roughened on the surface mechanically, This mechanical roughening treatment of the surface includes "dry-abrasive blasting" and "wet-abrasive blasting" and in these treatments, glass bead particles, glass powder particles, Carborundum particles or Alundum particles are forcedly sprayed and impinged on the aluminous material to roughen the surface of the aluminous material mechanically.

Among these treatments, in the wet-abrasive blasting, the sprayed particles are washed and removed in the abrasive blasting treatment and after said treatment, the thus treated aluminous molded material can be transferred to the next stop.

However, in the present invention it is merely necessary to roughen the surface mechanically and therefore the other mechanical treatments for roughening the surface may be effected.

The present invention is characterized in that the extrusion molded material can be directly subjected to a mechanical roughening treatment of the surface.

Namely, in the present invention, for example, the molded material extruded at a temperature of 400°–500°C is cooled and therefore the supersaturated state is maintained and in such a state surface treatments, for example, a mechanical roughening treatment of the surface, a treatment for forming a base layer and a painting treatment are effected.

Accordingly, the mechanical roughening treatment of the surface is carried out on a molded material in an unstable supersaturated state and consequently the surface is satisfactorily roughened and the cohesion of the painted film is improved. Namely, since the aluminous material is only extrusion molded and not subjected to an age hardening, the texture is unstable in the supersaturated state and therefore the surface can be satisfactorily roughened mechanically.

On the other hand, in the conventional process the age hardened aluminous material is subjected to a surface treatment and therefore the surface is not satisfactorily roughened by the mechanical roughening treatment and it is necessary to effect an etching treatment by means of a chemical and consequently the handling of the waste liquid becomes a problem in public nuisance and further the etching treatment is complicated.

After the mechanical roughening treatment, if necessary a base layer is formed and then a painting treatment is effected.

Finally, the aluminous material after the above described treatments is subjected to a heat treatment. This heat treatment serves to accomplish the age hardening of the aluminous material and also to accomplish the baking of the painted film and the treating conditions are as mentioned above.

The following examples are given for the purpose of illustration of this invention and are not intended as limitations thereof.

EXAMPLE 1

A billet of aluminum-based alloy AA 6063 was molded in a conventional extrusion working process to prepare a sample of molded material.

This sample of molded material was immersed in an aqueous solution of 6% NaOH at 60°C for 30 seconds to degrease and etch the molded material and then it was washed with water. The thus treated sample was immersed in an aqueous solution of 10% $HNO_3$, at room temperature for 20 seconds to effect neutralization and washed with water and then subjected to a surface roughening treatment. Then the sample was subjected to an anodic oxidation by using this sample as an anode for 30 minutes under usual conditions when an aqueous solution of sulfuric acid is used as an electrolytic bath to form an anodically oxidized film of 7–8$\mu$ as a base layer on the sample.

Then the sample was immersed in a water soluble thermosetting resin paint solution having the composition as described in the following Table for 1 minute and excess paint solution was removed and the paint was set and then baked and dried at a temperature of 180°C for 30 minutes, after which the painted sample was treated at a temperature of 205°C for 50 minutes to effect an artificial age hardening treatment.

| Paint composition | |
|---|---|
| Titanium oxide | 37.2% |
| Acrylic resin | 16.2% |
| Melamine resin | 4.0% |
| Triethanolamine | 2.0% |
| Glycol | 12.0% |
| Surfactant | 4.6% |
| Water | Balance |

In the above composition, titanium oxide is used for obtaining a white painted film and in order to obtain a transparent painted film, 100% is constituted by the remaining components excluding titanium oxide in the same ratio as described above. The cohesion of the formed painted films has no relation to the presence of the pigment of titanium oxide.

EXAMPLE 2

Aluminum-based alloy AA 6063 was subjected to a conventional extrusion molding process to form a sample of molded material. This sample was immersed in an aqueous solution of 6% NaOH at 60°C for 30 seconds to effect degreasing and etching and then washed with water and immersed in an aqueous solution of 10% $HNO_3$, at room temperature for 20 seconds to effect neutralization and washed with water.

Then, the thus treated sample was subjected to an anodic oxidation by using this sample as an anode of 30 minutes under conventional treating conditions when an aqueous solution of sulfuric acid is used as an electrolytic bath to obtain an anodically oxidized film of 7–8$\mu$ on the sample.

Then the thus treated sample was immersed in the water soluble thermosetting resin paint solution as described in Example 1 at room temperature for 1 minute. After which, excess paint solution was removed and the paint was set and the painted sample was heated at 205°C for 60 minutes to cure the paint covering the surface of the sample and simultaneously to effect the artificial age hardening.

EXAMPLE 3

The same aluminous material as in Example 1 was extruded and pretreated in the same manner as described in Example 1 and then the resulting molded sample was immersed in the same water soluble thermosetting resin paint solution as in Example 1 at room temperature for 2 minutes; excess paint solution was removed and the applied paint was set and the painted sample was heat treated at 200°C for 100 minutes to obtain an aluminous molded material covered with a painted film.

EXAMPLE 4

Aluminum-based alloy AA 6063 was extruded and then pretreated in the same manner as described in Example 1.

Then the resulting molded material was immersed in boiling pure water for 30 minutes to form a colorless clear boehmite layer on the surface of the molded material.

The molded material having the boehmite layer was painted in the same operation and condition as described in Example 1; excess paint solution was removed; the paint on the molded material was set and successively the painted molded material was treated with the same operation and conditions as in Example 2 to effect the curing of the painted film and the age hardening treatment. With respect to the resulting molded sample, the following test was made based on JIS in order to confirm the mechanical properties and the effect of the time of the artificial age hardening of the present invention was proved.

TEST a. Test item:

Hardness and tensile strength of the sample were tested.

The sample of molded material was tested in the state where the painted film and the base layer for painting were removed completely.

b. Test method:

1. Hardness.

The measurement was effected by dialindicator and the indicated value was compared with a value converted into Rockwell E scale.

2. Tensile strength.

From the sample of molded material a test piece was taken out as defined in JIS Z2201, No. 5 and the test was effected according to JIS Z2241.

c. Test result:

|  | JIS standard value | Prior to age hardening | After age hardening | | |
|---|---|---|---|---|---|
|  |  |  | a | b | c |
| Hardness | more than 65(general standard) | 42 | 78 | 76 | 77 |
| Tensile strength Kg/mm$^2$ | more than 15 | 14.8 | 27.5 | 26.9 | 27.5 |

Note: JIS standard value means mechanical properties required for aluminous molded material.

EXAMPLE 5

Aluminum-based alloy AA 6063 was extruded in a conventional manner to obtain a molded sample.

This sample was subjected to a wet-abrasive blasting treatment on a surface of the sample under the treating conditions as described in the following Table without effecting an age hardening treatment to obtain a moderate roughness on the sample.

Thus thus treated sample was immersed in boiling pure water for 30 minutes to form a colorless clear bohemite layer on the sample.

Then, the sample was immersed in the same water soluble thermosetting resin paint solution as described in Example 1 for 1 minute; excess paint solution was removed and the paint solution was set and then the painted sample was heated at 205°C for 120 minutes to cure the paint and simultaneously to effect age hardening.

In order to confirm the high cohesion of the painted film of the present invention, the following test was made.

SAMPLE A

The molded aluminous material was subjected to surface roughening treatment without effecting the age hardening treatment.

SAMPLE B.

The molded aluminous material was subjected to the age hardening treatment and then to the surface roughening treatment.

With respect to samples A and B, the depth of the roughness was determined and the results are shown in the following Table.

The conditions of the surface roughening treatment for samples A and B are shown in the following Table.

Table

| Particle size of glass beads ($\mu$) | 149–210 |
|---|---|
| Spray pressure Kg/cm$^2$ | 5 |
| Spray distance mm | 50 |
| Spray angle | 90° |
| Spray time (sec.) | 36 |
| Test result |  |
| A | 10.4$\mu$ |
| B | 9.0$\mu$ |

REFERENCE

Usual chemical surface roughening treatment:

A sample was immersed in 6% NaOH at 60°C for the following time.

| 30 sec. | 1–1.5$\mu$ |
|---|---|
| 5 min. | about 2$\mu$ |

From the above data, the effect when the surface roughening treatment is effected before the age hardening treatment can be confirmed and the difference of effect from the conventional chemical surface treatment is remarkable. The above comparison shows the improvement of the cohesion of the painted film of the present invention.

When an anodic oxidation treatment was effected instead of the above described surface roughening treatment, the same effect as described above was obtained.

EXAMPLE 6

Aluminum-based alloy AA 6063 was extrusion molded in the same manner as described in Example 1 to obtain a molded sample. This sample was immersed in an aqueous solution of 8.0% NaOH at 60°C for 30 seconds to effect degreasing and washing with water and then immersed in an aqueous solution of 10% HNO$_3$ at room temperature for 20 seconds to effect neutralization and washed with water. The thus treated molded sample was immersed in the water soluble thermosetting resin paint solution as described in Example 1 containing 2.0% of dimethylethanolamine at room temperature for 2 minutes; excess paint solution was removed and the paint was set and subsequently heated at 200°C for 60 minutes to obtain an aluminous molded material coated with the paint.

With respect to the resulting molded material, the following tests were made.

1. Test for effectiveness of the age hardening.

In the same manner as described in Example 4, the hardness and the tensile strength of the resulting molded material was determined. These properties were compared with those of the molded material prior to the heat treatment for the age hardening.

As a result, the hardness was improved by more than 30–40 in the Rockwell E scale and the tensile strength was improved by more than 10–15 Kg/mm.

2. Test for formation of boehmite base layer.

With respect to the surface of the aluminous material, the formation of a boehmite layer was confirmed by using an X-ray analyzer. Then the insolubility of this boehmite layer was tested and it has been confirmed that the boehmite layer has a satisfactory insolubility.

3. Test for cohesion of painted film.

The painted film endured a conventional weather resistance test.

EXAMPLE 7

Aluminum-basd alloy AA 6063 was extrusion molded in the same manner as described in Example 1 to obtain a molded sample.

On the surface of the molded sample were forcedly sprayed glass bead particles to roughen the surface mechanically.

Then the thus treated molded sample was immersed in boiling water containing 2% of dimethylmethanolamine for 15 minutes to form a boehmite base layer on the molded sample. Thereafter, the molded sample was immersed in the water soluble paint solution as described in Example 1 at 50°C for 3 minutes; excess paint solution was removed for 8 minutes; the paint was set for 8 minutes and then heated at 205°C for 60 minutes to bake the painted film and simultaneously to effect age hardening to obtain a molded material coated with the painted film having a high cohesion to the aluminous base.

What is claimed is:

1. In a method for producing painted molded aluminous material in which an aluminous material is subjected to extrusion molding, the molded material is subjected to an artificial age hardening treatment; to conventional pre-treatments of degreasing, neutralization, washing with water and a surface-roughening treatment; and to a treatment for forming a base layer for painting by (1) anodic oxidation (2) treatment in boiling water or an aqueous solution of a chemical agent for forming a boehmite layer or (3) spraying with steam; the thus treated molded material is coated with a thermosetting paint and the painted molded material is heated to cure the painted film, the improvement which comprises, (a) subjecting the extrussion molded aluminous material in a super-saturated condition and having a hardness of less than 65 kg/mm$^2$ and a tensile strength of less than 15 kg/mm$^2$ to conventional pre-treatments without first effecting artificial age hardening (b) subjecting the pre-treated material to a treatment for forming a base layer for painting (c) coating the material with a film of a thermosetting paint and (d) heat treating the painted material at a temperature of 205±5°C. for 50–120 minutes to effect said age hardening treatment simultaneously with the curing of the painted film.

2. The method as claimed in claim 1, wherein said paint is an aqueous solution of a water soluble thermosetting resin paint containing an organic amine and said molded material coated with said paint containing water and the organic amine is heated to effect an age hardening treatment on the molded material and at the same time to form a boehmite base layer on the aluminous material and to cure the painted film.

* * * * *